United States Patent
Grant

[11] Patent Number: 5,237,830
[45] Date of Patent: Aug. 24, 1993

[54] DEFROST CONTROL METHOD AND APPARATUS

[75] Inventor: Charles D. Grant, Dublin, Ohio

[73] Assignee: Ranco Incorporated of Delaware, Wilmington, Del.

[21] Appl. No.: 825,554

[22] Filed: Jan. 24, 1992

[51] Int. Cl.$^5$ ............................................. F25B 47/02
[52] U.S. Cl. ......................................... 62/155; 62/234
[58] Field of Search ............................ 62/155, 234, 158

[56] References Cited

U.S. PATENT DOCUMENTS

| | | | |
|---|---|---|---|
| 3,663,938 | 5/1972 | Baer | 320/48 |
| 3,668,423 | 6/1972 | Couch | 307/208 |
| 3,697,879 | 10/1972 | Holliday | 328/61 |
| 3,721,908 | 3/1973 | Jurjans | 328/131 |
| 3,854,103 | 12/1974 | Takarada | 331/55 |
| 3,890,798 | 6/1975 | Fujimoto et al. | 62/155 |
| 4,011,428 | 3/1977 | Fosnough et al. | 219/10.55 B |
| 4,047,058 | 9/1977 | Green | 307/293 |
| 4,102,389 | 7/1978 | Wills | 62/158 |
| 4,132,085 | 1/1979 | Maio et al. | 62/155 |
| 4,137,463 | 1/1979 | Scott et al. | 307/141 |
| 4,251,988 | 2/1981 | Allard et al. | 62/80 |
| 4,253,153 | 2/1981 | Bitterli et al. | 364/505 |
| 4,276,925 | 7/1981 | Palmieri | 165/12 |
| 4,330,751 | 5/1982 | Swain | 328/61 |
| 4,384,461 | 5/1983 | Kurtz | 62/157 |
| 4,417,450 | 11/1983 | Morgan, Jr. et al. | 62/158 X |
| 4,417,452 | 11/1983 | Ruminsky et al. | 62/234 X |
| 4,429,278 | 1/1984 | Steinlein | 328/129.1 |
| 4,430,828 | 2/1984 | Oglevee et al. | 47/17 |
| 4,518,849 | 5/1985 | Rolland | 219/492 |
| 4,538,420 | 9/1985 | Nelson | 62/140 |
| 4,564,953 | 1/1986 | Werking | 377/52 |
| 4,676,403 | 6/1987 | Goudy, Jr. et al. | 222/54 |
| 4,680,940 | 7/1987 | Vaughn | 62/234 X |
| 4,731,729 | 3/1988 | Vetrecht et al. | 364/505 |
| 4,745,629 | 5/1988 | Essig et al. | 377/20 |
| 4,850,204 | 7/1989 | Bos et al. | 62/234 |
| 4,884,414 | 12/1989 | Bos | 62/156 |

*Primary Examiner*—Harry B. Tanner
*Attorney, Agent, or Firm*—Watts, Hoffmann, Fisher & Heinke

[57] ABSTRACT

A defrost controller for a refrigeration system. The system includes a circuit having a programmable controller which monitors compressor demand from a thermostat and uses alternating current cycles of a line voltage to control on and off cycles for a defrost mode of the refrigeration system. An anti-short cycle feature is optionally included to inhibit compressor operation for a predetermined interval each time the compressor is disabled.

11 Claims, 6 Drawing Sheets

DEFROST CONTROL METHOD AND APPARATUS

FIELD OF THE INVENTION

The present invention concerns refrigeration systems and more particularly concerns refrigeration systems having a controller for periodically defrosting a system heat exchanger.

BACKGROUND ART

Refrigeration systems such as refrigerators, heat pumps, air conditioners and the like use heat exchangers for heating or cooling a region. A heat exchange surface can become covered with frost and then ice as the heat exchanger gathers heat from the surrounding atmosphere. If ice is allowed to accumulate substantially the efficiency of the heat exchanger and the system as a whole is reduced, making it more expensive to operate the refrigeration system. Techniques are known in the prior art for periodically defrosting refrigeration system heat exchangers that have become covered with ice.

One common defrost procedure reverses refrigerant flow through the system. This causes hot refrigeration to flow through the ice-covered heat exchanger and melt accumulated ice from the heat exchanger. Refrigerant flow reversal is usually initiated by a controller coupled to a refrigerant flow reversing valve. The controller outputs a two state control signal where one state causes the refrigeration system to operate in a normal heating or cooling mode. In the second signal state, the reversing valve is actuated to reverse the refrigerant flow and defrost the heat exchanger for a time period sufficient to clear accumulated ice from the heat exchanger. This defrost period is typically substantially shorter than the time it takes for the ice to accumulate. Prior art controllers therefore provide a two state control signal wherein a defrost signal is substantially shorter in duration than the heating/cooling signal.

Another defrosting procedure employs electric heaters which are periodically energized to melt accumulated ice or frost from heat exchangers. These heaters are operated from controllers like the refrigerant flow reversing valves.

U.S. Pat. No. 4,731,729 to Uetrecht et al. discloses a timing control circuit for producing two sequential events having different durations. The disclosed control has particular application in environmental systems. The timing control circuit disclosed in the '729 patent is programmable and contains a single oscillator and a binary counter set to count a predetermined number of oscillator output cycles. At the end of a first count, oscillator tuning components are switched to change the oscillator frequency and the counter is reset. Changing the frequency changes the duration for the next count and the next corresponding event.

U.S. Pat. No. 4,745,629 to Essig et al. discloses a defrost timer circuit having a duty cycle providing alternate ON and OFF intervals corresponding to different timer circuit logic states. The timer is constructed using an integrated circuit having two independent clock sources, each driving a respective counter. While one counter times out, the circuit output is in one state and while the other counter times out, the output is in the other logic state.

The present invention concerns a defrost control apparatus and method for periodically defrosting a refrigeration system heat exchanger. After a predetermined heating or cooling interval the control apparatus initiates a defrost of the heat exchanger for a controlled time interval.

DISCLOSURE OF THE INVENTION

Defrosting of a refrigeration system heat exchanger is governed by monitoring heating or cooling demands of a region, counting cycles of an alternating current power source during the heating or cooling demand periods; and initiating a defrost of the heat exchanger after a predetermined heating or cooling demand period that is timed by counting the alternating current power cycles.

In accordance with a preferred embodiment of the invention, a defrost control unit includes a programmable controller having one input for monitoring the signal from a thermostat and a second input coupled to the AC line signal. During compressor run times when the thermostat places heating or cooling demands on the refrigeration system, the programmable controller counts AC line cycles and uses this count to time both the defrost interval and heating or cooling interval. These timed intervals are determined by constants read into the programmable controller. In a preferred design, these constants are selectable so that a limited range of different cycle times can be chosen. This allows different heating and cooling apparatus to be controlled using a common control circuit.

Counting alternating current cycles of the line voltage avoids the need for a separate oscillator or oscillators to time ON/OFF intervals. While the frequency of an oscillator can change as the components age or degrade, line voltage frequency remains constant.

An additional feature of the invention prevents short cycling of a refrigeration system compressor motor. If the controller senses termination of a heating or cooling demand or a power loss of approximately one half a line cycle, it inhibits compressor motor operation for a short time interval. This avoids rapid cycling off and on of the compressor. At the instant the compressor motor is disabled, pressure differentials have built up around the refrigeration system. Disabling the compressor motor for a short interval allows these pressures to equalize before the compressor motor is allowed to restart. Without this anti-short cycle feature, the motor might not be unable to overcome the high pressure head and be damaged due to overheating.

An automatic reset function is provided so that in the event of a controller malfunction, the defrost cycling is re-instituted automatically. Details concerning this and other features of the invention can become better understood from a description of a detailed embodiment of the invention which is described in conjunction with the accompanying drawings.

BEST MODE OF CARRYING OUT THE INVENTION

Figure 1:
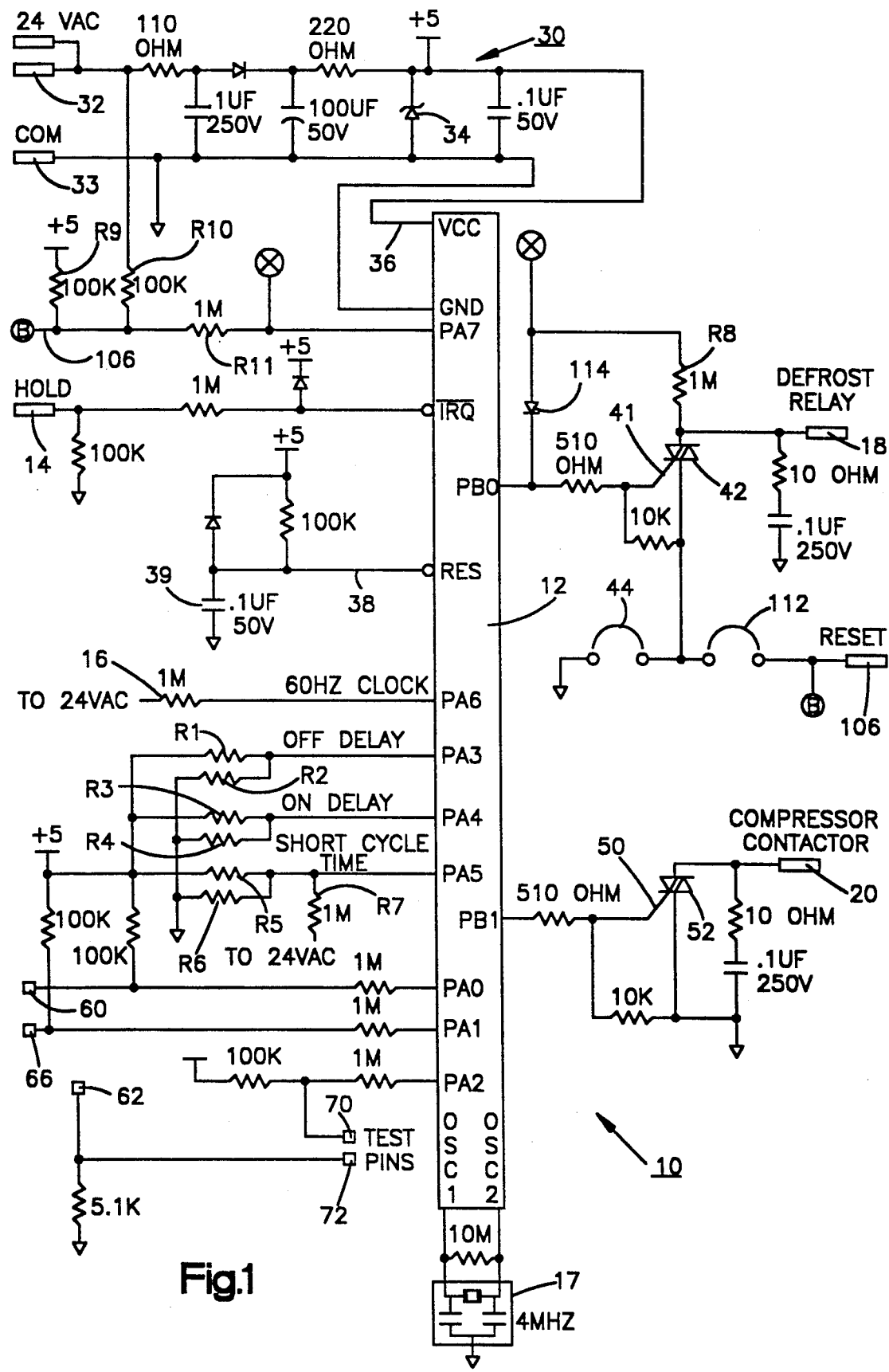
FIG. 1 is a schematic of a control circuit including a programmable controller for controlling the defrost cycle of a refrigeration system having a heat exchanger.

Turning now to the drawings, FIG. 1 depicts a defrost control circuit 10 having a programmable controller 12 that executes a control program to control a defrost cycle of a refrigeration system heat exchanger. The control circuit 10 includes an input 14 for monitoring a signal corresponding to heating and cooling requests placed upon the heat exchanger. One representative use of the control circuit 10 is in conjunction with a heat pump and the input 14 is controlled by an indoor thermostat 15 (see FIGS. 2-4) and is designated as a hold input. A second input 16 to the circuit 10 is coupled to an alternating current line signal having a frequency of 50 or 60 cycles per second. When the indoor thermostat places a heating or cooling demand on the heat exchanger, the programmable controller 12 counts AC line signal cycles and uses this count to time the defrost interval. The specific time intervals chosen for both defrost and heating or cooling are determined by constants that are read into the programmable controller 12.

The operating program of the programmable controller 12 is stored in a ROM memory portion of the controller. The preferred programmable controller is an 8-bit application specific microprocessor commercially available from a number of sources. A clock signal of 4 megahertz is provided by an external oscillator 17 coupled across input pins 0SC1, 0SC2 to the microprocessor. When power is applied to the circuit 10, the programmable controller 12 executes its control algorithm and cycles through a main processing loop (described below) to monitor the inputs 14, 16 and control the status of two outputs 18, 20 from the control circuit 10. A first output 18 actuates a defrost cycle of the refrigeration system heat exchanger and a second output 20 is optionally used to deactivate a compressor motor that circulates refrigerant through the refrigeration system.

The programmable controller 12 is coupled to a power supply 30 having two inputs 32, 33. The input 32 couples a 24-volt alternating current input signal to the circuit 10 and the input 33 is grounded. The 24 volt alternating current signal is derived from a step down transformer which converts 110-volt alternating current line voltage into the 24-volt alternating current signal for energizing the control circuit 10. The power supply 30 filters this signal to integrate the oscillating AC signal and couples the pulsed DC signal across a zener diode 34 having a breakdown voltage of 5 volts. This produces a 5-volt signal which is used throughout the control circuit 10 and is also coupled to the VCC input 36 to the programmable controller.

When the 5-volt VCC signal is first provided to the circuit 10, a reset signal is temporarily applied at a reset pin RES. An input 38 remains low until a capacitor 39 charges thereby removing the reset input. This power-on-reset assures the controller 12 begins its operating program at a fixed memory location each time power is applied to the circuit 10.

In the disclosed embodiment of the invention, pin PB0 of the programmable controller 12 is set high to pull the output 18 to ground and actuate a relay coil 40 (FIGS. 2-4) for initiating a defrost cycle. The output 20 is pulled low by setting pin PB1. In certain embodiments of the invention this output is used to control activation of the compressor motor of the refrigeration system and prevent so called short cycling of the compressor motor.

The output 18 is pulled low by applying a high signal from pin PB0 to a gate input 41 of a triac 42. When the gate input 41 goes high, the triac is rendered conductive and the output 18 pulled low through a jumper 44 to ground. In a similar fashion, when the output at pin PB1 goes high, the high input at the gate 50 turns on a triac 52 causing the contact 20 to be grounded.

The programmable controller 12 causes the refrigeration system to alternate between normal and defrost cycles by alternate energization and de-energization of the coil 40. Normal cycles are designated as "defrost off" intervals and are longer than the "defrost on" intervals. The programmable controller 12 determines the time period for "defrost off" intervals by reading signals at pins PA0, PA1 and PA3. A low input at pin PA0 and high input at pin PA3 designates a 30-minute time period and is set by connecting a jumper between a contact 60 and a contact 62 and installing a resistor R1 between pin PA3 and VCC. When the contacts 60, 62 are connected by means of the jumper, the voltage at input pin PA0 is pulled low.

Pin PA1 is pulled low by inserting a jumper between the contact 66 and the contact 62. With pin PA3 high, the programmable controller 12 then selects a 60-minute interval. If neither the input pins PA0 or PA1 is low, a default 90-minute interval is indicated. By removing R1 and installing R2 (to pull pin PA3 low), "defrost off" times of 50, 70 and 90 minutes are selected. This is summarized in Table I below:

TABLE I

| PA0 | PA1 | PA3 | OFF TIME |
| --- | --- | --- | --- |
| 0 | 1 | 1 | 30 minutes |
| 1 | 0 | 1 | 60 minutes |
| 1 | 1 | 1 | 90 minutes |
| 0 | 1 | 0 | 50 minutes |
| 1 | 0 | 0 | 70 minutes |
| 1 | 1 | 0 | 90 minutes |

The "defrost on" times are determined by the input signal at pin PA4. If a resistor R3 is installed, pin PA4 is high and a 10-minute "defrost on" time is selected. With a resistor R4 installed, pin PA4 is low and a 14-minute "defrost on" time is selected.

The circuit 10 operates either 60 hertz or 50 hertz alternating current inputs. The on and off times are lengthened by 20% if 50 hertz AC power is used.

The control program of the programmable controller 12 can inhibit so-called short cycling of the compressor. To implement this feature, the controller 12 monitors the periods that the compressor is not running. If a request to operate the compressor is made before expiration of the predetermined short cycle time, this request is ignored until expiration of the short cycle time period. The short cycle option can be set to provide no short cycle inhibiting, or time delays of 3 or 5 minutes. The setting is read by the controller 12 at pin PA5. If a resistor R5 is installed, a short cycle time of 3 minutes is selected. If a resistor R6 is installed, a short cycle time of 5 minutes is selected. If a resistor R7 is installed between pin PA5 and the AC input 32, no short cycle inhibiting of compressor operation is implemented.

Diagnostic testing of the circuit 10 is initiated by shorting two test contacts 70, 72 to pull pin PA2 of the controller low. When the controller 12 senses this condition it increments variables in software at a rate that causes the heat exchanger defrost on/off cycles as well as short cycle inhibiting to be speeded by a factor of 256.

Figure 2:
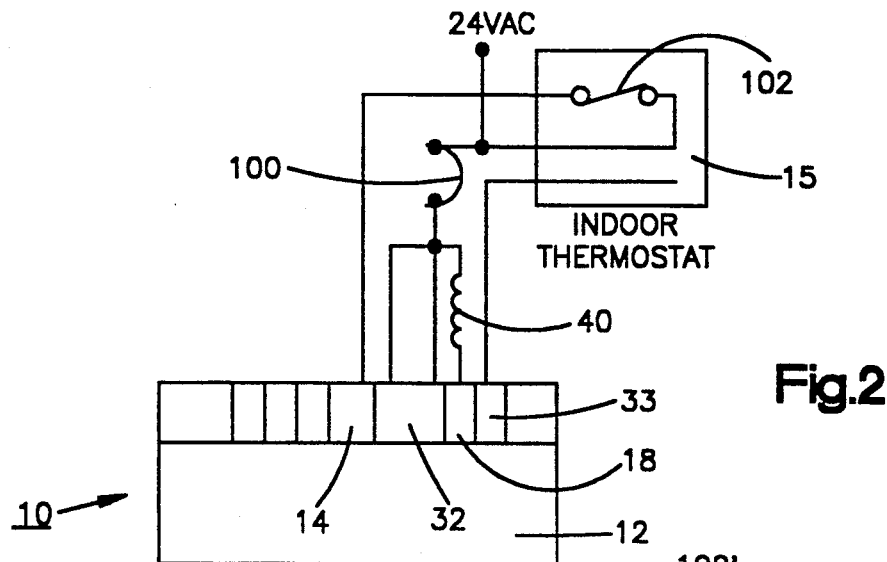
FIGS. 2-4 show alternate connections between the apparatus of FIG. 1 and a thermostat that monitors heating and/or cooling demands placed on the refrigeration system and couples indications of those demands to the FIG. 1 circuit.
Figure 3:
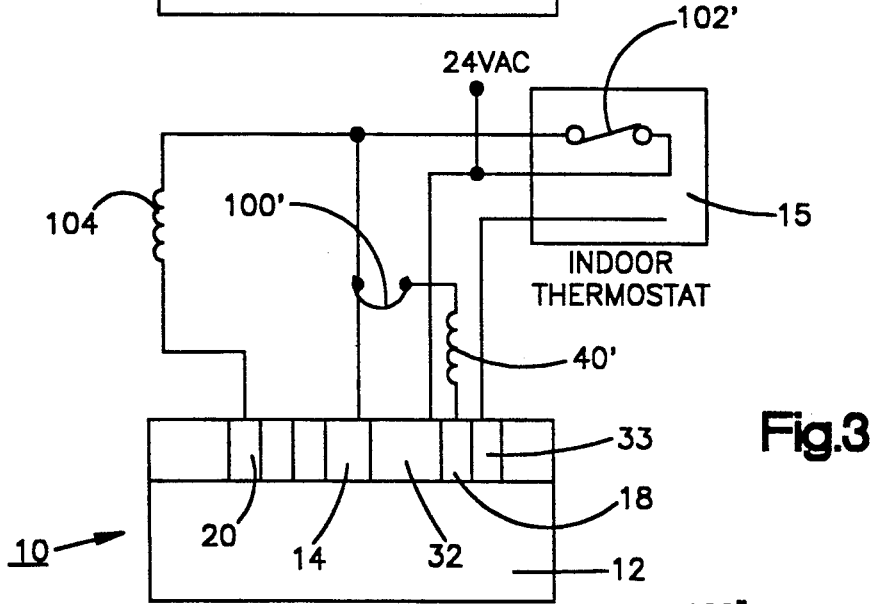
Figure 4:
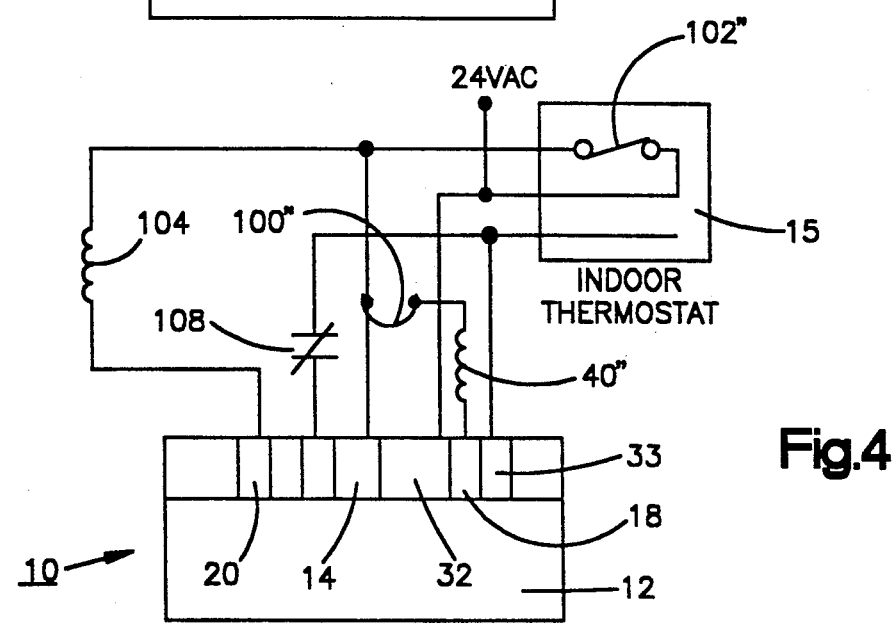

FIGS. 2-4 depict three representative interfaces for connecting the indoor thermostat 15 and the control circuit 10. In FIG. 2, the 24-volt AC signal from the step down transformer (not shown) is coupled to the alternating current input 32 through a defrost temperature sensor 100. If the outdoor ambient temperature is above a set point temperature of this sensor 100, the sensor opens the connection between the 24-volt AC signal and the input 32. This also disrupts the connection of an energization signal to the defrost coil 40 and inhibits any defrosting of the heat exchanger so long as the temperature remains above the threshold temperature. In a typical application, this temperature is approximately 34° F.

At temperatures below the threshold, the 24-volt alternating current signal energizes the circuit 10 and the status of the hold input 14 is controlled by a thermostat switch 102 which routes the 24-volt alternating current signal to the input 14. When the indoor thermostat 15 senses a temperature below the set point temperature of the thermostat, the 24-volt AC signal is supplied to the input 14 and the compressor motor actuated to force refrigerant through the refrigeration system. Depending on the accumulated run time of the compressor in its normal operating mode, this may cause the coil 40 to be energized to start a defrost cycle.

FIG. 3 depicts an alternate configuration showing an interface between the thermostat 15 and the circuit 10. In this embodiment, a defrost sensor 100' is connected between the output from the thermostat switch 102' and the relay coil 40'. When the sensor 100' opens, the connection between the 24 volt AC signal and the relay coil 40 is disrupted and no defrost of the refrigeration system can occur. Again, the sensor 100' is chosen to open at a temperature of approximately 34° F. In the FIG. 3 embodiment, the 24-volt AC input 32 to the circuit 10 continues to be maintained regardless of the state of the sensor 100'. This allows the anti-short cycle feature of the invention to be implemented by the circuit 10. A compressor motor (not shown) is activated by energizing a relay coil 104 when the switch 102' is closed. If the signal at the triac gate 50 (FIG. 1) is removed by the controller 12, the output 20 is no longer grounded, so the compressor remains disabled.

In the FIG. 4 embodiment of the invention a reset input 106 (FIG. 1) is coupled to ground through a contact 108 that is held open when the coil 40" is energized. If power to the coil 40" is disrupted by an opening of the sensor 100", the contact 108 closes to ground the input 106. This causes the controller 12 to clear accumulated compressor run times. When the temperature again falls below the 34° F. set point of the sensor 100" a full defrost cycle will thus occur.

Various software reset options are implemented by use of the jumper 44 and selection of the resistors R9, R10, R11. The controller operating system periodically checks the status of pin PA7. If this status changes from high to low, the run times are cleared. With the jumper 44 installed and the resistors R9, R11 installed, the input PA7 is reset by applying a low signal at the input 106. This is the configuration used with the FIG. 4 interface. When the contacts 108 close due to opening of the sensor 100", the reset transition at pin PA7 occurs. If the resistors R10, R11 are installed, the input PA7 is reset by allowing the input 106 to float. When the transition from high to low of the AC input 32 occurs, this is transmitted through resistor R10 and the reset is implemented.

To implement an additional reset option, the path to ground through the jumper 44 is removed and a jumper 112 is installed. This provides the path to ground for the relay coil 40' so long as the input 106 is grounded. Additional modifications are insertion of a diode 114 between pin PB0 and PA7 and installation of a resistor R8. The three resistors R9, R10, R11 are not installed in this configuration.

With no defrost taking place, pin PB0 is low and this also pulls pin PA7 low. When pin PB0 goes high, the diode 114 isolates this signal from pin PA7 and so long as the triac 42 conducts pin PA7 remains low. If the reset input 106 goes high, the AC signal on the relay coil 40 will be coupled to the pin PA7 through the resistor R8 and a software reset is implemented.

OPERATING SYSTEM

Figure 5:
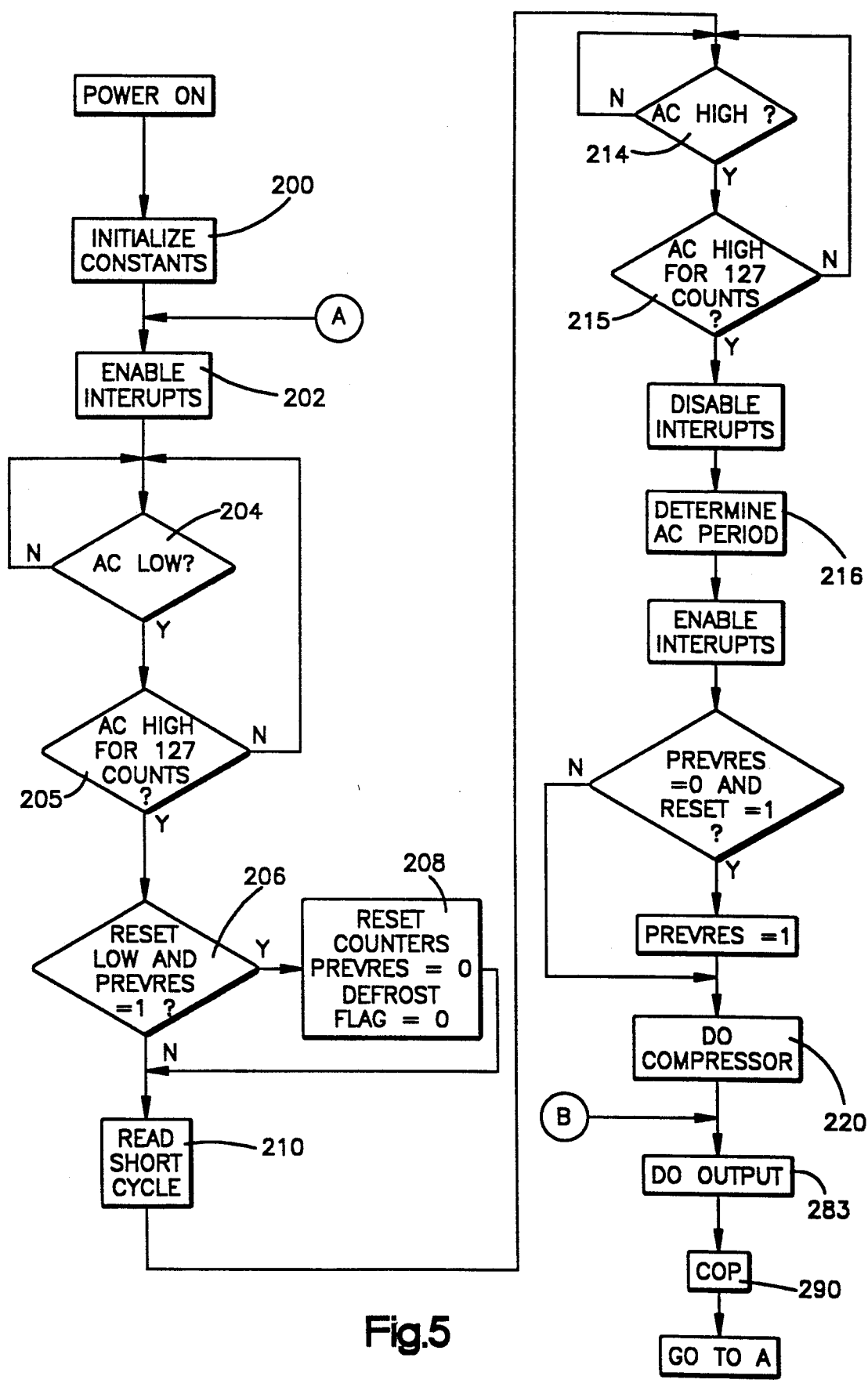
FIGS. 5, 5A and 6-8 are flow diagrams showing the operation of the FIG. 1 programmable controller in controlling the defrost cycle of the heat exchanger.

Each time power is applied across the VCC and GND pins of the controller 12, the controller jumps to a specific memory location to begin executing instructions. Flow control diagrams illustrating the operations performed by these instructions are shown in FIGS. 5, 5A and 6-8. As seen in FIG. 5, the first step the controller 12 performs is an initialization step 200 where constants are initialized and memory is zeroed. Also, at this step a computer operating properly (COP) bit is set. If the operating system does not reach a point to clear that bit within a specified time, an internally generated reset is performed to resynchronize the controller 12.

Table II below indicates certain variables and constants used by the control or operating system:

TABLE II

Variables
1. Short cycle count
2. Defrost count
3. Hold Flag (1 bit)
4. Compressor flag
5. Defrost flag
6. Previous reset flag
7. Previous short cycle flag
   Hardware Selectable Values
1. Short cycle time
2. Defrost time (on time)
3. Defrost off time (off time)

Subsequent to the initialization step 200, the programmable controller 12 enters a main loop by enabling its interrupts 202 and determining 204 whether the 24-volt AC signal at the input 16 coupled to pin PA6 is low. If this signal is low, the controller 12 monitors 205 this input for 127 readings (approximately 0.8 millisecs) to assure it stays low. This effects debouncing and assures noise immunity and allows for accurate counting of the AC input power cycles. Any noise or transient-induced waveforms are ignored since the controller returns to the step 204 if the signal is not low for 127 consecutive readings.

Once the conditions of the monitoring step 205 are satisfied, the controller 12 branches to a step 206 to see if a reset signal at the input 106 has been received and a previous reset flag has been set. If it has, the controller branches to a step 208 where the defrost on and off counters are reset, the previous reset bit is cleared and the defrost flag is cleared. The reset input 106 controls the signal at pin PA7 so that this reset is different from a hardware reset at the reset input pin RES of the microprocessor controller.

By determining at step 206 whether the previous value of the reset flag was high and the present value is low, the controller debounces the reset input and immunizes the input from noise. At the step 208, the previous value of the reset flag is set to zero to indicate the present status of the reset input.

At a next step 210 the controller 12 reads the short cycle time at pin PA5 and then waits 214 receipt of a high signal at the alternating current input 16. After the AC input goes high the controller 12 continues to monitor 215 the input to assure 127 successive readings are high. If the AC input remains stable, the controller 12 disables its interrupts and determines 216 the period of the AC line signal and stores this period for later use. The value that is stored is computed by averaging the preceding four AC period calculations.

The period of the AC signal stored at the step 216 is used by the controller 12 to implement short cycle protection of the compressor motor. If the alternating current signal at the input 16 is absent for longer than approximately one half a line cycle, the short cycle inhibit function should be enabled.

Figure 8:
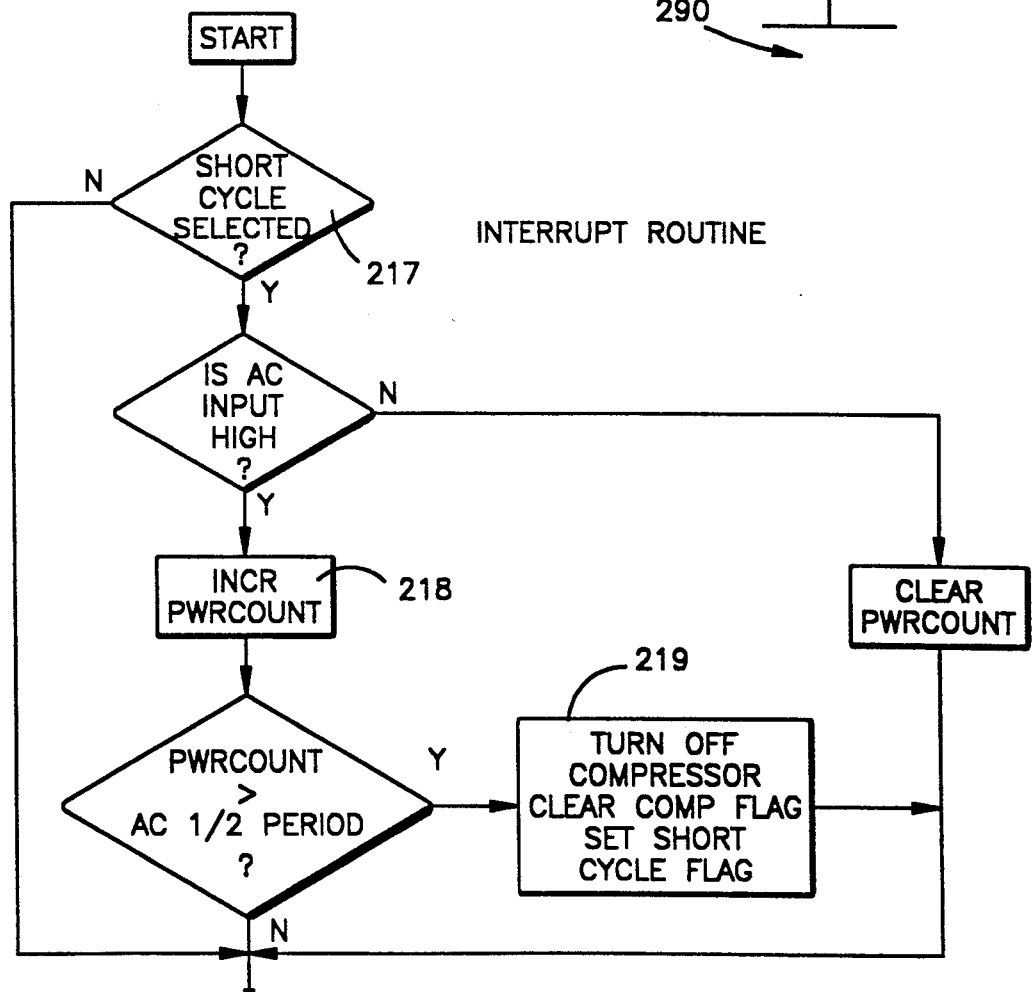
Figure 6:
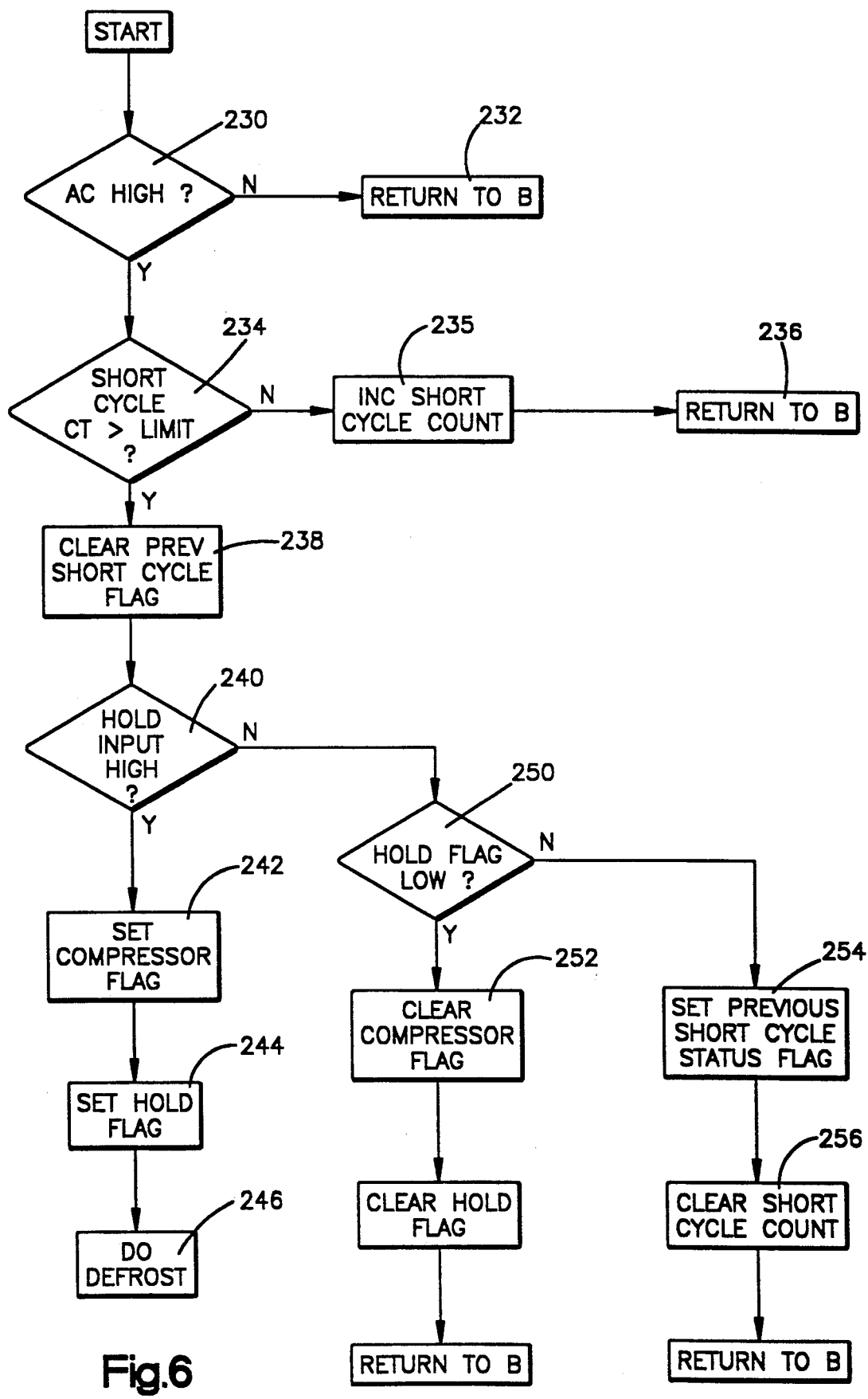

The programmable controller includes an internal timer driven off the external 4 megahertz clock input. Each time the internal timer overflows, an interrupt is generated and the interrupt processing routine of FIG. 8 is executed by the controller 12. This occurs only when the interrupts are enabled.

In a preferred embodiment, every 2,048 clock cycles (approximately 512 microseconds), an interrupt from the timer is received and the FIG. 8 algorithm executed. This algorithm first determines 217 if a short cycle inhibit function has been selected. If it has not, the controller returns from the interrupt processing routine. If the short cycle inhibit option has been chosen, the routine next determines if the alternating current input is high. If the input is not high, a power count variable power count is incremented at a step 218 and a determination made if the power count value is greater than one half the alternating current cycle time that is determined at step 216.

If the power count is greater than one half the alternating current cycle time, it is an indication that the alternating current input has been low longer than one half cycle time. This causes the compressor to be disabled at a step 219. Additionally, the anti-short cycle flag is set. If the power count is less than or equal to one half the alternating current cycle time period, the controller branches back to the main processing routine.

The FIG. 8 algorithm allows disruptions in power to be monitored. The alternating current time period determined at the step 216 is stored and compared with the power count incremented during negative alternating current half cycles. In the event power is disrupted, the alternating current input will go low and stay low. After one half cycle time, the power count valve will increase to a value greater than the number corresponding to the average alternating current period and cause the compressor to be turned off and a previous anti-short cycling flag set to implement the anti-short cycling option.

Returning to the main processing loop, at a step 220 the controller 12 jumps to a compressor subroutine which determines the status of the hold input 14 from the thermostat 15. As a first step 230 of this routine (FIG. 6), the controller 12 assures itself that the AC signal at the input 16 is high. The compressor routine will only be branched to in the event the controller 12 believes this to be the case and if it is not, the controller returns at a step 232 to the main loop routine of FIG. 5.

Figure 7:
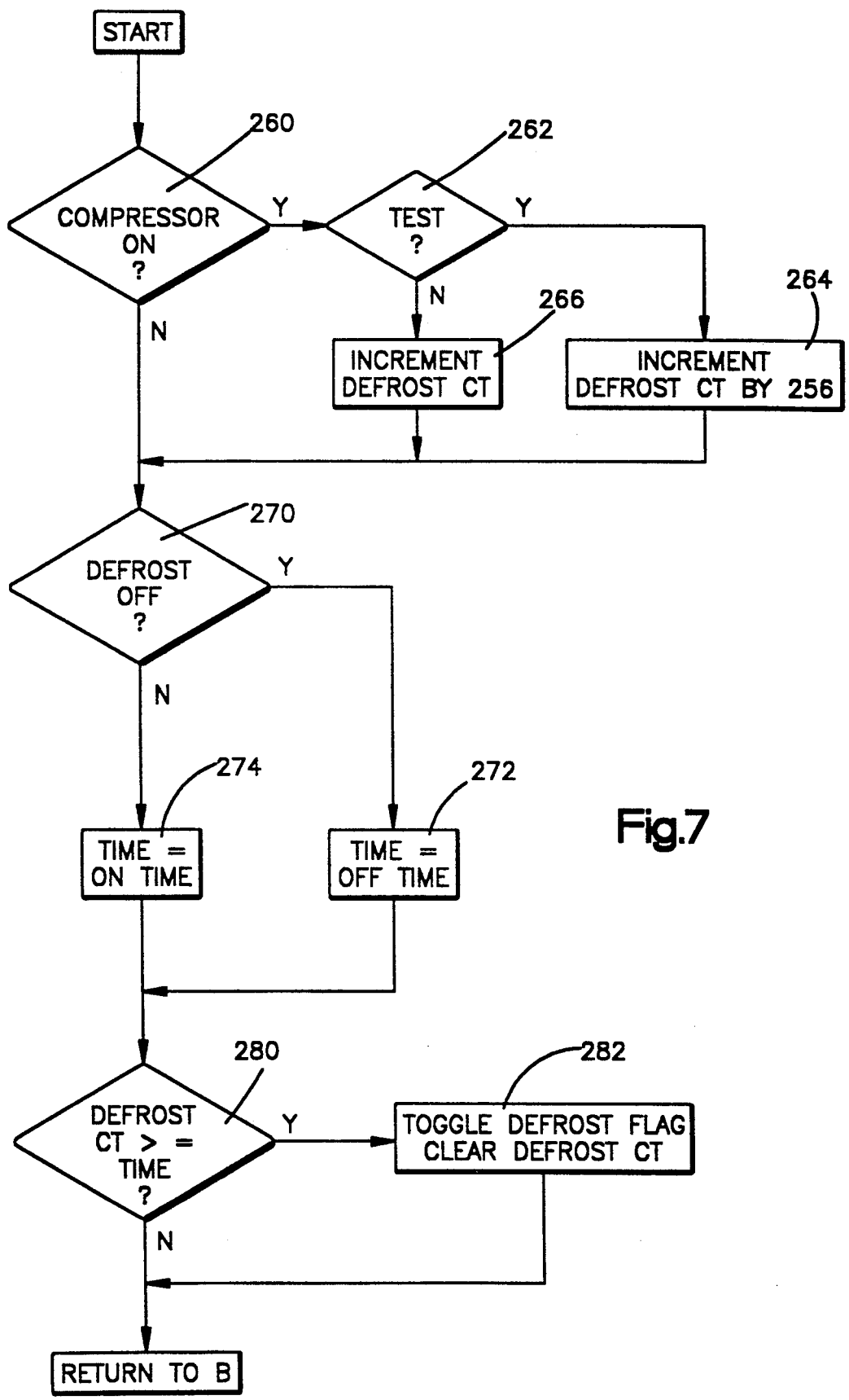

At a next step 234, the controller 12 compares the value of the a short cycle count stored in memory with a limit value input at pin PA5. If the short cycle limit is not exceeded, it is an indication that any request for compressor operation should be ignored so the controller 12 increments 235 a short cycle count and returns 236 to the main processing loop. If the short cycle inhibit option is not chosen, the limit will be zero and the "yes" branch from the decision step 234 is taken. If the short cycle time limit has been exceeded, the controller clears 238 a previous short cycle flag and determines 240 if the hold input 14 is high or low. Since the hold input is coupled (via the thermostat) to the same alternating current signal as the alternating current input 16, when the input 16 is high and the thermostat is requesting compressor operation, the input 14 is also high. When a high signal is sensed at the monitoring step 240, a compressor flag is set 242, a hold flag is set 244 and a branch 246 is taken to a defrost routine (FIG. 7). During the defrost routine, a determination is made whether to energize the defrost relay coil 40 to reverse refrigerant flow through the refrigeration system.

Returning to the determining step 240 in which the hold input 14 is monitored, if the hold input is not high, this means that the thermostat is not requesting compressor operation and a branch is made to a decision-making step 250 to see if a hold flag bit is low. If the hold flag is low, the hold flag and the hold input 14 are logically consistent, and a compressor flag is cleared 252. This compressor flag is checked upon return to the main routine to determine whether or not the output 20 to the compressor actuator should be grounded.

If the hold flag is not low, this means that during the previous execution of this routine the thermostat was requesting compressor operation and the flag was set at step 244. Since the hold input is now low it just changed state. This could be an indication that power was disrupted for at least one half cycle during a period when compressor operation is requested, i.e., the hold flag is high but no hold input signal is present. It could also mean the thermostat switch 102 just opened due to the set point temperature being satisfied. The response to either situation is a setting 254 of a previous short cycle status flag and the clearing 256 of a short cycle count. The short cycle count will, therefore, be less than the short cycle limit on the next successive branch to the compressor routine if the short cycle inhibit option is selected.

Turning now to FIG. 7, the defrost routine begins at a step 260 in which the status of the compressor flag is checked. If the compressor flag is set, a determination is made 262 whether a test mode has been selected by shorting the contacts 70, 72 (FIG. 1). If the test mode has been selected, timing is speeded up and this is indicated by incrementing 264 of the defrost count by 256 rather than the normal step 266 of incrementing the defrost count by one. This increased count rate is also used at the step 235 where the short-cycle count is incremented if the pins 70, 72 are shorted. At a next decision step 270 the status of a defrost flag is checked. When the system is operating in normal mode, i.e. no defrost is taking place, the value of a variable designated "time" is set to the off-time read into the microprocessor. This is accomplished at step 272 of the FIG. 7 flow chart. If, however, the system is being defrosted, the same "time" variable is set 274 to the on-time which is also read into the microprocessor. At a next decision step 280 the defrost count is compared with the time value read into the microprocessor. If the defrost count exceeds this time, the on or off time has been exceeded and the controller 12 toggles the defrost flag and clears the defrost count 282. If the defrost count does not exceed this variable, a return to the main subroutine is performed. Upon return from the compressor and/or defrost subroutines of FIGS. 6 and 7, the microprocessor executes an output routine 283 that writes data to its two output pins PB0, PB1 to control the status of the two outputs 18, 20.

Figure 5A:
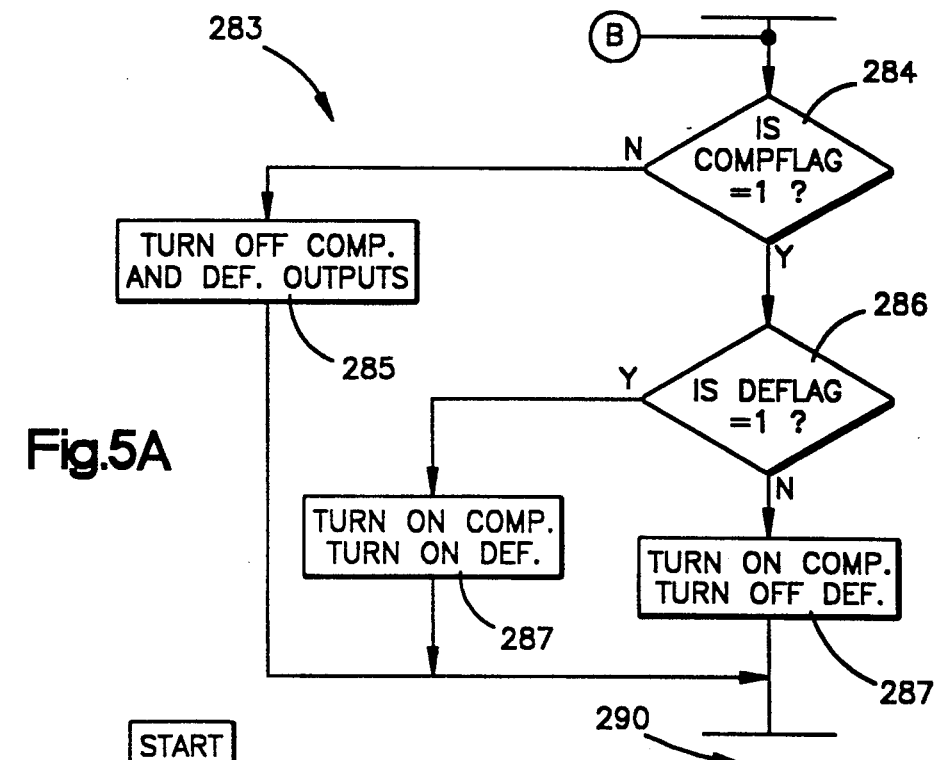

The flow chart of FIG. 5A shows details of the output routine 283. At step 284 the compressor flag bit is checked. If it is not set, both pins PB0 and PB1 are grounded to turn off 285 the compressor and the defrost coil. If the controller determines 286 that the defrost flag is set, pin PB1 is set high to allow the compressor motor to run and PB0 is also set high to activate the defrost coil 40. If the defrost flag is not set but the compressor flag is set, the compressor is allowed to run but the defrost coil 40 is not activated. These options are implemented by the steps 287, 288 in FIG. 5A.

If the short cycle option is not chosen, pin PB1 remains high so long as the status of the hold input and the AC signal remain synchronized. This is accomplished at step 242 of the flow chart in FIG. 6. The defrost flag, however, is toggled back and forth at step 282 of FIG. 7 as the defrost count reaches the on and off times read into the microprocessor. This causes the coil 40 to be activated and deactivated in a fashion dictated by the selected on off cycle times.

The last step 290 executed by the main processing loop (FIG. 5) is to clear the status of the computer operating properly (COP) bit. If this bit is not cleared and a COP time period expires, a hardware reset of the microprocessor occurs and a branch is made to step 200. If, however, everything is operating properly, the computer operating properly bit is cleared at step 290 and a branch is made to the step 202 where the main operating loop is again executed.

In operation, the microprocessor executes the main operating loop again and again. So long as the hold input remains low and is not synchronized with the alternating current signal, the branch 240 is taken and no counting of the defrost count variable occurs. Once the hold input is actuated by the thermostat switch 102, however, the controller 12 cycles between normal operating mode and defrost mode at time intervals controlled by the on time and off time read into the microprocessor. If the switch 102 opens in the FIG. 3 embodiment of the interfacing, the coil 40' is de-energized but the status of the various counters are maintained. This means when the switch 102 closes again and compressor operation called for, if the disruption occurred during a defrost cycle, that cycle is completed. If the disruption occurred during a normal operating mode the normal operating mode count continues from its point of disruption.

In the FIG. 4 embodiment, however, a disruption caused by opening of the switch 102" not only disables the coil 40" but also causes a reset at the input 106. This causes the controller 12 to re-initialize the various counts at step 208 of the main operating routine (FIG. 5).

The present invention has been described with a degree of particularity. It is the intent, however, that the invention include all modifications from this deferred embodiment falling within the spirit or scope of the appended claims.

I claim:

1. Apparatus for use with a refrigeration system wherein refrigerant circulates through a heat exchanger comprising:
   a. control means for monitoring compressor run time by counting cycles of an AC line voltage when the compressor is running including a programmable controller having an input that can be coupled to a thermostat for monitoring a heating or cooling demand signal and having a defrost output for outputting a defrost signal after a programmable period of compressor run time as indicated by the number of AC line cycles counted during the presence of the demand signal at said input; and
   b. defrost means coupled to the programmable controller for defrosting the heat exchanger in response to receipt of a defrost signal.

2. The apparatus of claim 1 wherein the programmable controller includes a compressor output for controlling compressor operation and timer means for inhibiting compressor operation for a predetermined time interval after each period of compressor run time to prevent short cycling of the compressor.

3. The control apparatus of claim 1 wherein the programmable controller comprises a counter for counting AC cycles of the line voltage and means for resetting the counter each time a defrost cycle is started and each time a defrost cycle is completed.

4. The apparatus of claim 3 wherein the programmable controller includes input means for setting a defrost time interval and for setting a second non-defrosting time interval and wherein the controller compares an accumulated number of AC line cycles with a first value corresponding to the defrost time interval, resets the accumulated number and removes the defrost signal from the defrost output when the accumulated number reaches the first value, and then begins comparing an accumulated number of AC line cycles with a second value corresponding to the second non-defrosting time interval.

5. A refrigeration system control unit for governing defrosting of a system heat exchanger in response to sensed conditions; said control unit comprising a programmable controller having a first input for monitoring heating or cooling demands of a region, a second input for monitoring cycles of an alternating current power source and an output for initiating defrost of the heat exchanger, said programmable controller programmed to periodically check a status of the first and second inputs, update a count at the cycle rate of the second input during heating or cooling demand periods as indicated by the first input; and initiate a defrost of the heat exchanger after a predetermined heating or cooling demand period based upon the value of said count.

6. In a refrigeration system, a method for governing defrosting of a system heat exchanger; said method comprising the steps of sensing an alternating current signal that passes through a thermostat switch to activate a compressor motor during heating or cooling demand periods, subsequent to sensing a presence of the alternating current signal, counting cycles of an alternating current power source during the heating or cooling demand periods; and initiating a defrost of the heat exchanger after a predetermined cumulative heating or cooling demand period based upon a comparison between a count of said cycles and a defrost count corresponding to the cumulative heating or cooling demand period.

7. The method of claim 6 comprising the additional step of enabling the routing of refrigerant through the refrigeration system during the heating or cooling demands and additionally comprising the step of disabling said routing for a predetermined interval subsequent to a removal of the demand.

8. The method of claim 7 where the refrigeration system includes a compressor motor and wherein the disabling step prevents starting of the compressor motor for a time interval after it stops.

9. The method of claim 6 comprising the additional step of enabling the routing of refrigerant through the refrigeration system during the heating or cooling demands and additionally comprising the step of disabling said routing for a predetermined interval if the alternating current power source is disrupted.

10. The method of claim 6 wherein the step of counting alternating current power source cycles is performed by repeatedly sampling an alternating current signal for a number of times to assure the status of the alternating current signal is stable for at least the time interval of said sampling.

11. The method of claim 6 wherein the monitoring and counting steps are performed by a programmable controller and wherein a count stored by the controller is re-initialized if the defrost cycle is terminated in response to a sensed temperature above a predetermined set point temperature.

* * * * *